(No Model.)
M. E. CHILDS.
APPARATUS FOR CUTTING PICTURE MATS WITH CIRCULAR OPENINGS OR HOLES.
No. 534,061. Patented Feb 12, 1895.
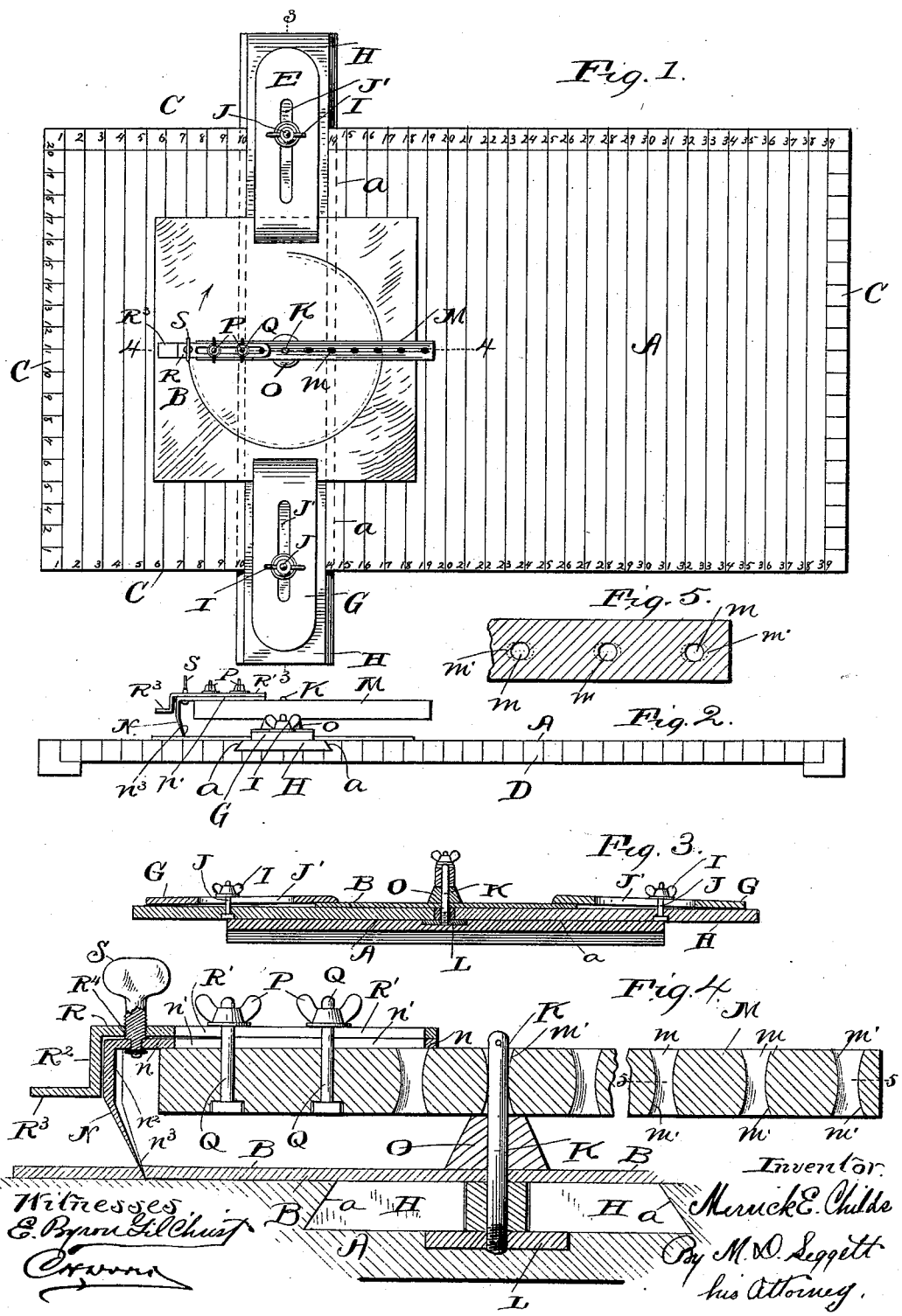
Inventor
Merrick E. Childs
By M. D. Leggett
his Attorney
Witnesses
E. Byron Gilchrist

UNITED STATES PATENT OFFICE.

MERRICK E. CHILDS, OF WEST LIBERTY, IOWA.

APPARATUS FOR CUTTING PICTURE-MATS WITH CIRCULAR OPENINGS OR HOLES.

SPECIFICATION forming part of Letters Patent No. 534,061, dated February 12, 1895.

Application filed May 7, 1894. Serial No. 510,285. (No model.)

*To all whom it may concern:*

Be it known that I, MERRICK E. CHILDS, of West Liberty, in the county of Muscatine and State of Iowa, have invented certain new and useful Improvements in Apparatus for Cutting Picture-Mats with Circular Openings or Holes; and I do hereby declare the following to be a full, clear, and exact description of the invention, such as will enable others skilled in the art to which it pertains to make and use the same.

My invention relates to improvements in apparatus for cutting picture-mats with circular openings or holes.

Merchants or dealers in the picture-framing business, for cutting picture mats of the character indicated, have heretofore been dependent, either upon other establishments operating expensive machinery, or upon the use of a jack-knife, which latter it is obvious could only do the work imperfectly and in an unsatisfactory manner.

The object of my invention is to construct a machine or apparatus for making picture-mats with circular openings or holes; that is simple in construction and inexpensive; that is durable and easily operated; whereby the work can be done with great accuracy, and whereby the ordinary merchant or dealer in the picture-framing business shall cease to be dependent upon other establishments for the cutting of his picture-mats.

With this object in view, my invention consists in certain features of construction, and in combination of parts, hereinafter described and pointed out in the claims.

In the accompanying drawings, Figure 1 is a top plan of a machine embodying my invention. Fig. 2 is a front side elevation. Fig. 3 is a vertical section on line 3—3, Fig. 1. Fig. 4 is an enlarged section on line 4—4, Fig. 1, and Fig. 5 is a section on line 5—5, Fig. 4.

My improved machine comprises a board or table A upon which the mat-board B to be cut is placed. A scale C, for the purpose of measuring and squaring or externally trimming the mats to be cut, is marked upon the upper surface of board or table A along the edges of said board or table, and the front edge of the board or table is preferably provided with a scale D to be used when the adjacent scale on the upper surface of the table is more or less covered. A mat-board B, that is to be provided with a circular opening or hole, is shown in position upon board or table A. The mat-board having been properly trimmed externally, is secured upon the supporting-board or table in any approved manner, but preferably by means of a pair of clamps E and G adjustable toward and from each other transversely of board or table A and adapted to engage the mat-board preferably at diametrically opposite points, respectively. Said clamps are removably secured to slides H that are adapted to operate endwise of slideways *a* formed in and arranged transversely of board or table A. Each clamp is secured to its supporting-slide preferably by means of a thumb-nut I and a stud or bolt J engaged by said nut and extending through the respective slide, one or more washers being preferably interposed between the securing-nut and upper surface of the clamp, and the hole J′ in the clamp, through which the stud extends, being elongated in the direction required to accommodate the adjustment of the clamp.

The adjustability of the mat-board holding-clamps toward and from each other, as hereinbefore described, accommodates different sizes of mat-boards.

The mat-board that is to be provided with a circular opening or hole is mounted upon a pin or bearing K suitably secured to supporting-board or table A. The mat-board, at a point located centrally of the opening or hole to be cut in the mat-board, is first provided with a hole and the mat-board is then placed in position upon the supporting-board or table with the hole thus made in the mat-board engaging the pin or bearing K on the table. I would here remark that pin K is preferably externally screw-threaded at its lower end and engages a nut L rigidly secured to the supporting-board or table.

A horizontally-arranged rotating knife-bearing bar M that is provided with a series of vertical holes *m* arranged at suitable intervals apart lengthwise of the bar, is rotatably mounted upon pin or bearing K, by the engagement of said pin or bearing with any one of the aforesaid holes in the bar, and the knife or cutter N is located at one end of bar M, and the sweep of the knife or cutter is increased or diminished according as bar M is adjusted endwise to bring the knife or cutter farther from or nearer to the axis of the bar.

A washer, O, is interposed between the knife-bearing bar and mat-board to be cut, and a washer O' is preferably interposed between the mat-board and nut L. The knife or cutter is secured to the adjacent end of the knife-bearing bar in any suitable manner, but preferably by means of a pair of thumb-nuts P that engage correspondingly threaded shanks of bolts Q extending through the knife-bearing bar, the holes $n'$ in the shank $n$ of the knife or cutter being elongated in the direction required to accommodate the adjustment of the knife or cutter toward and from the axis of the supporting-bar, said adjustability of the knife or cutter enabling a finer adjustment to be made than is accommodated by the series of holes in the knife-bearing-bar. The holes in the knife-bearing-bar are arranged preferably about an inch apart so that in case an adjustment of only a fraction of an inch is desired the same is effected by adjusting the knife or cutter, as hereinbefore indicated. The holes in the knife-bearing bar are somewhat elongated at the top and bottom in the direction of the length of the bar, as shown at $m'$ in Fig. 4, whereas, the central portion of said holes are left perfectly round, as shown in Fig. 5, by which construction binding of the bar M upon the axial pin or bearing is avoided, and which construction also affords an upward and downward play to the knife or cutter.

The large washer or collar O' upon the axial pin or bearing of the knife-bearing bar below the latter corresponds or approximately corresponds in height with the extension of the knife or cutter below the knife-bearing bar in order to accommodate the operation of said bar and knife, and said washer is quite large at its base to assist in retaining the mat-board in proper position upon the table.

The shank of the knife or cutter, a suitable distance beyond the supporting-end of the knife-bearing-bar, is bent downwardly, as at $n^2$, and said downwardly-extending portion of the shank, at its lower end, terminates in the cutting-blade $n^3$ that declines inwardly obliquely to the mat-board to be cut, so that in the cutting operation a beveled edge shall be formed upon the mat-board around the circular opening or hole cut therein.

A bent metallic strip or bar R that engages the upper side of the horizontally-arranged portion of the shank of the knife or cutter and the outer side of the downwardly-extending portion $n^2$ of said cutter, is preferably secured to the knife-bearing-bar preferably by means of the same bolts and nuts that secure the knife to said bar, and the holes R' in said metallic bar or strip through which the bolts extend are elongated in the direction required to accommodate the endwise adjustment of said metallic strip in adjusting the knife toward and from the axis of the knife-bearing-bar. The downwardly-extending portion $R^2$ of bar or strip R that engages the depending portion of the shank of the knife or cutter assists in steadying the knife or cutter in the cutting operation, said depending or steadying-member of bar or strip R, at its lower end, being provided with a laterally and outwardly-projecting flange or finger-hold $R^3$ which the operator takes hold of with the thumb and finger of the right hand during the cutting operation.

A vertically-arranged thumb-screw, S, is operatively connected with the horizontally arranged portion of the shank of the knife or cutter, said screw extending through a correspondingly-threaded hole $R^4$ in member R, by which construction it will be observed that the portion of member R that is provided with the threaded hole just referred to, constitutes a nut in engagement with the screw, and that the cutting-blade of the knife or cutter is lowered or elevated according as screw S is turned in the one direction or the other, and that by means of said screw the cutting-blade can be raised, lowered and guided down the bevel to be formed upon the mat-board in the cutting-operation.

What I claim is—

1. In apparatus for cutting picture-mats with circular openings, the combination with a board or table A, and suitable means for holding the mat-board in place upon the table, of an upright pin or bearing K and a knife-bearing-bar M rotatably mounted upon said pin or bearing and provided at suitable intervals lengthwise thereof with holes or perforations for engaging said pin or bearing, substantially as and for the purpose set forth.

2. In apparatus for cutting picture-mats with circular openings, the combination with a board or table A, and suitable means for holding the mat-board in place upon the table, of an upright pin or bearing K and a knife-bearing-bar M rotatably mounted upon said pin or bearing and provided at suitable intervals lengthwise thereof with holes or perforations for engaging said pin or bearing, with said holes or perforations elongated in the direction of the length of the bar, substantially as and for the purpose set forth.

3. In an apparatus for cutting picture-mats with circular openings or holes, the combination with a board or table A and suitable means for holding the mat-board in place upon the table, of a swinging or rotatable knife-bearing bar supported a suitable distance above the top surface of the table, knife N having its shank secured to one end of said bar and bent downwardly, as at $n$, at the end of the bar, said downwardly-extending portion of the knife terminating in the cutting or working-member of the knife,—the steadying bar or strip R suitably secured to the knife-bearing-bar, said steadying bar or strip having a depending member $R^2$ adapted to engage the outer side of the depending portion of the shank of the knife or cutter and terminating, at its lower end, in a finger-hole $R^3$, all arranged substantially as shown, for the purpose specified.

In testimony whereof I sign this specification, in the presence of two witnesses, this 14th day of February, 1894.

MERRICK E. CHILDS.

Witnesses:
 C. H. DORER,
 WARD HOOVER.